(12) United States Patent
Yu et al.

(10) Patent No.: US 11,198,788 B2
(45) Date of Patent: Dec. 14, 2021

(54) RESIN COMPOSITION AND ARTICLE MADE THEREFROM

(71) Applicant: ELITE MATERIAL CO., LTD., Taoyuan (TW)

(72) Inventors: Yi-Fei Yu, Taoyuan (TW); Ching-Hsien Hsu, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 48 days.

(21) Appl. No.: 16/224,105

(22) Filed: Dec. 18, 2018

(65) Prior Publication Data
US 2020/0148881 A1 May 14, 2020

(30) Foreign Application Priority Data

Nov. 9, 2018 (TW) .................................. 107139974

(51) Int. Cl.
| | | |
|---|---|---|
| C08L 79/04 | (2006.01) |
| C08L 33/08 | (2006.01) |
| C08L 67/00 | (2006.01) |
| C08L 63/00 | (2006.01) |
| C08L 33/14 | (2006.01) |
| C08J 5/24 | (2006.01) |
| C08J 5/18 | (2006.01) |
| C08G 73/06 | (2006.01) |

(52) U.S. Cl.
CPC ................. *C08L 79/04* (2013.01); *C08J 5/18* (2013.01); *C08J 5/24* (2013.01); *C08L 33/08* (2013.01); *C08L 33/14* (2013.01); *C08L 63/00* (2013.01); *C08L 67/00* (2013.01); *C08G 73/0627* (2013.01); *C08J 2300/24* (2013.01); *C08J 2379/08* (2013.01); *C08J 2433/08* (2013.01); *C08L 2203/16* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 10,774,210 | B2* | 9/2020 | Hsu | .......................... C08L 33/08 |
| 2003/0018131 | A1* | 1/2003 | Davis | ...................... C08L 63/00 |
| | | | | 525/107 |
| 2005/0288457 | A1* | 12/2005 | Liu | ..................... C08G 59/4042 |
| | | | | 525/529 |
| 2009/0110938 | A1* | 4/2009 | Nishimura | .............. B32B 15/14 |
| | | | | 428/425.8 |
| 2014/0008822 | A1* | 1/2014 | Bai | ........................ H01L 23/293 |
| | | | | 257/793 |
| 2018/0324956 | A1* | 11/2018 | Xiong | .................... B32B 15/043 |

* cited by examiner

*Primary Examiner* — Megan McCulley
(74) *Attorney, Agent, or Firm* — Muncy, Geissler, Olds & Lowe, P.C.

(57) ABSTRACT

A resin composition and an article made from the resin composition are provided. The resin composition comprises: 30 parts by weight of thermosetting resin; 50 to 125 parts by weight of maleimide resin; and 5 to 35 parts by weight of monofunctional long-chain alkyl acrylate monomer. The resin composition is capable of achieving a proper viscosity and a good filling property whiling maintaining a high glass transition temperature.

8 Claims, No Drawings

RESIN COMPOSITION AND ARTICLE MADE THEREFROM

CROSS-REFERENCE TO RELATED APPLICATION

This application claims the priority benefits of Taiwan Patent Application No. 107139974, filed on Nov. 9, 2018. The entirety the above-mentioned patent application is hereby incorporated by reference herein and made a part of this specification.

BACKGROUND

1. Field of the Disclosure

The present disclosure relates to a resin composition and more particularly to a resin composition comprising thermosetting resin, maleimide resin and monofunctional long-chain alkyl acrylate monomer and being used for making a prepreg, a resin film, a resin film with copper foil, a laminate or a printed circuit board.

2. Description of Related Art

Conventional copper-clad laminates currently available on the market are mostly made from a resin composition containing epoxy resin as the major resin and using benzoxazine resin, dicyandiamide or novolac resin as the major curing agent with further addition of bromine-containing or phosphorus-containing flame retardant, inorganic filler, etc. However, said material fails to provide satisfactory thermal resistance and dielectric properties that meet the demands of fast-developing electronic products.

In order to achieve high glass transition temperature of electronic materials, bismaleimide resin-based laminates were also proposed; however, the presence of a large amount of maleimide resin in a thermosetting resin system will cause excessively intense reaction of resins in high temperature, and prepregs made therefrom have undesirably high viscosity and poor resin flowability, which results in non-smooth laminates or filling problem during layer buildup processes and therefore fails to make circuit boards with desirable properties.

Therefore, it is a primary object of the present disclosure to provide a prepreg with a proper viscosity and a good filling property whiling maintaining a high glass transition temperature.

SUMMARY

A primary object of the present disclosure is to provide a resin composition, comprising: 30 parts by weight of thermosetting resin; 50 to 125 parts by weight of maleimide resin; and 5 to 35 parts by weight of monofunctional long-chain alkyl acrylate monomer.

In one embodiment, the thermosetting resin comprises epoxy resin, polyphenylene oxide resin (a.k.a., polyphenylene ether resin), cyanate ester resin, benzoxazine resin, phenolic resin, styrene maleic anhydride or a combination thereof.

For example, the thermosetting resin may comprise 4 to 20 parts by weight of epoxy resin, 3 to 20 parts by weight of cyanate ester resin and 5 to 20 parts by weight of benzoxazine resin.

In one embodiment, the maleimide resin comprises 4,4'-diphenylmethane bismaleimide, oligomer of phenylmethane maleimide (a.k.a., polyphenylmethane maleimide), m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylenemaleimide, N-phenyl maleimide, maleimide compound containing aliphatic long-chain structure or a combination thereof. Unless otherwise specified, the aforesaid maleimide resin may comprise a prepolymer thereof, such as a prepolymer of diallyl compound and maleimide compound, a prepolymer of diamine compound and maleimide compound, a prepolymer of multi-functional amine compound and maleimide compound or a prepolymer of acid phenol compound and maleimide compound, but not limited thereto.

In one embodiment, the monofunctional long-chain alkyl acrylate monomer has a structure as shown below:

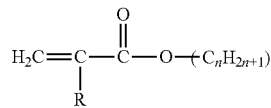

wherein R is hydrogen or a $C_1$ to $C_6$ aliphatic group, and n is an integer of 6 to 40.

In one embodiment, the monofunctional long-chain alkyl acrylate monomer has a molecular weight of less than or equal to 1000.

In one embodiment, the resin composition further comprises a property modifier, which may comprise a small molecule vinyl compound, an amine curing agent, a phenoxy resin, a polyester, a polyolefin resin or a combination thereof. For example, the resin composition may further comprise 20 to 40 parts by weight of a polyester.

In one embodiment, the resin composition may further comprise flame retardant, inorganic filler, curing accelerator, solvent, coupling agent, coloring agent, toughening agent or a combination thereof.

The resin compositions of various embodiments may be used for making different articles, such as a prepreg, a resin film, a resin film with copper foil, a laminate and a printed circuit board.

In one embodiment, the article made from the resin composition has the following property: a glass transition temperature as measured by using a dynamic mechanical analyzer by reference to IPC-TM-650 2.4.24.4 of greater than or equal to 200° C.

In one embodiment, the article made from the resin composition has the following property: a peeling strength as measured by using a tensile strength tester by reference to IPC-TM-650 2.4.8 of greater than or equal to 3.4 lb/in.

In one embodiment, the article made from the resin composition has a minimum dynamic viscosity of less than or equal to 500 Pa·s.

In one embodiment, the article made from the resin composition is characterized by absence of void by visual inspection in a filling property test.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

As described above, a primary object of the present disclosure is to provide a resin composition, comprising: 30 parts by weight of thermosetting resin; 50 to 125 parts by weight of maleimide resin; and 5 to 35 parts by weight of monofunctional long-chain alkyl acrylate monomer.

As used herein, the thermosetting resin comprises, but not limited to, epoxy resin, polyphenylene oxide resin, cyanate ester resin, benzoxazine resin, phenolic resin, styrene maleic anhydride or a combination thereof.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof, but not limited thereto.

The novolac epoxy resin may comprise phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin.

The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin. The DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

The polyphenylene oxide resin described above may include any known polyphenylene oxide resins used in the art, including but not limited to a hydroxyl-terminated polyphenylene oxide, a vinyl-terminated polyphenylene oxide, a maleimide-terminated polyphenylene oxide, an anhydride-terminated polyphenylene oxide resin or a cyanate-terminated polyphenylene oxide resin. The vinyl-terminated polyphenylene oxide is a vinyl-capped polyphenylene oxide, wherein the capping vinyl group is a reactive vinyl group. Examples of polyphenylene oxide resin include, but not limited to: vinylbenzyl-terminated polyphenylene oxide resin (e.g., OPE-2st available from Mitsubishi Gas Chemical Co., Inc.), methacrylate-terminated polyphenylene oxide resin (e.g., SA-9000 available from SABIC), vinylbenzyl-modified bisphenol A polyphenylene oxide resin, vinyl-containing chain-extended polyphenylene oxide resin or a combination thereof.

The cyanate ester resin is not particularly limited and may be any compound with an Ar—O—C≡N structure, wherein Ar represents a substituted or unsubstituted aromatic group, novolac, bisphenol A, bisphenol A novolac, bisphenol F, bisphenol F novolac or phenolphthalein. For example, the cyanate ester resin may be available under the tradename Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza, but not limited thereto.

The benzoxazine resin may be any one or more benzoxazine resins used for preparing a prepreg, a resin film, a resin film with copper foil, a laminate or a printed circuit board. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, dianiline benzoxazine resin and phenyl-, vinyl- or allyl-modified benzoxazine resin. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl-modified benzoxazine resin) or KZH-5032 (phenyl-modified benzoxazine resin) available from Kolon Industries Inc. The dianiline benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

The phenolic resin may be any one or more phenolic resins used for preparing a prepreg, a resin film, a resin film with copper foil, a laminate or a printed circuit board, examples including but not limited to novolac resin, such as phenol novolac resin, naphthol novolac resin, biphenyl novolac resin, and dicyclopentadiene phenol resin.

The styrene maleic anhydride resin may be any one or more styrene maleic anhydride resins used for preparing a prepreg, a resin film, a resin film with copper foil, a laminate or a printed circuit board, wherein the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, but not limited thereto.

According to the present disclosure, the thermosetting resin is not particularly limited, examples including any one or more of epoxy resin, polyphenylene oxide resin, cyanate ester resin, benzoxazine resin, phenolic resin, and styrene maleic anhydride. A preferred thermosetting resin comprises epoxy resin, cyanate ester resin and/or benzoxazine resin. Relative to 30 parts by weight of the thermosetting resin, the amount of epoxy resin may be for example greater than 0 to 30 parts by weight, preferably 4 to 30 parts by weight, preferably 4 to 20 parts by weight, and more preferably 4 to 12 parts by weight. Relative to 30 parts by weight of the thermosetting resin, the amount of cyanate ester resin may be for example greater than 0 to 30 parts by weight, preferably 3 to 20 parts by weight, and more preferably 3 to 14 parts by weight. Relative to 30 parts by weight of the thermosetting resin, the amount of benzoxazine resin may be for example greater than 0 to 30 parts by weight, preferably 5 to 20 parts by weight, and more preferably 10 to 20 parts by weight.

As used herein, the maleimide resin refers to a compound, monomer, mixture, or polymer (including oligomer) containing at least one maleimide group. Unless otherwise specified, the maleimide resin used in the present disclosure is not particularly limited and may include any one or more maleimide resins used for preparing a prepreg, a resin film, a resin film with copper foil, a laminate or a printed circuit board. Examples include but are not limited to 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylenemaleimide, N-phenyl maleimide, maleimide compound containing aliphatic long-chain structure or a combination thereof. In addition, unless otherwise specified, the aforesaid maleimide resin may comprise a prepolymer thereof, such as a prepolymer of diallyl compound and maleimide compound, a prepolymer of diamine compound and maleimide compound, a prepolymer of multi-functional amine compound and maleimide compound or a prepolymer of acid phenol compound and maleimide compound, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Co., Ltd., or products such as BMI-70 and BMI-80 available from K.I Chemical Industry Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 sold by Designer Molecules Inc.

Relative to 30 parts by weight of the thermosetting resin, the resin composition of the present disclosure may comprise 50 to 125 parts by weight of maleimide resin, such as 60, 80, 100 or 120 parts by weight.

According to the present disclosure, the monofunctional long-chain alkyl acrylate monomer comprises any one or more long-chain alkyl esters of a monofunctional acrylate, wherein "monofunctional" refers to the presence of a single active functional group (e.g., a carbon-carbon unsaturated bond, such as a vinyl group), "long-chain alkyl" refers to an alkyl with at least six carbon atoms, such as 6 to 40 carbon atoms, and "monomer" refers to a small molecule has not been subject to an addition reaction by a double bond or a triple bond but has a potential to react with the same or different molecule to form a polymer via an addition reaction.

In one embodiment, the monofunctional long-chain alkyl acrylate monomer has a structure as shown below:

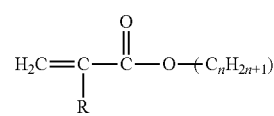

wherein R is hydrogen or a $C_1$ to $C_6$ aliphatic group, and n is an integer of 6 to 40.

For example, R may be a $C_1$ to $C_6$ alkyl group, including but not limited to methyl, ethyl, n-propyl, isopropyl, n-butyl, isobutyl, and tert-butyl, such as methyl, ethyl, n-propyl, or isopropyl. For example, n may be 6, 8, 10, 15, 20, 25, 30, 35 or 40, preferably an integer of 10 to 30, such as an integer of 12 to 18.

In one embodiment, the monofunctional long-chain alkyl acrylate monomer has a molecular weight of less than or equal to 1000. For example, the monofunctional long-chain alkyl acrylate monomer may have a molecular weight of between 100 and 1000, such as between 100 and 500 or between 200 and 400.

Examples suitable for the monofunctional long-chain alkyl acrylate monomer of the present disclosure include but are not limited to products sold by Sartomer, such as SR313A, SR313B, SR313NS, SR324NS, SR335 and SR489D, preferably SR313A, SR313B, SR313NS and SR324NS.

Relative to 30 parts by weight of the thermosetting resin, the resin composition of the present disclosure may comprise 5 to 35 parts by weight of the monofunctional long-chain alkyl acrylate monomer, such as 10, 20 or 30 parts by weight.

In addition, the resin composition of the present disclosure may further optionally comprise a property modifier, which may comprise a small molecule vinyl compound, an amine curing agent, a phenoxy resin, a polyester, a polyolefin resin or a combination thereof. The amount of the property modifier is not particularly limited. For example, relative to 30 parts by weight of the thermosetting resin, the resin composition of the present disclosure may comprise 5 to 70 parts by weight of one or more property modifiers, such as 10, 20, 30, 40, 50, 60 or 70 parts by weight.

The small molecule vinyl compound as used herein refers to a vinyl-containing compound with a molecular weight of less than or equal to 1000, preferably between 100 and 900 and more preferably between 100 and 800. According to the present disclosure, the small molecule vinyl compound may include, but not limited to, divinylbenzene (DVB), bis(vinylbenzyl) ether (BVBE), bis(vinylphenyl)ethane (BVPE), triallyl isocyanurate (TAIC), triallyl cyanurate (TAC), 1,2,4-trivinyl cyclohexane (TVCH) or a combination thereof.

The amine curing agent may include, but not limited to, any one or a combination of diamino diphenyl sulfone, diamino diphenyl methane, diamino diphenyl ether, diamino diphenyl sulfide and dicyandiamide.

Examples of the phenoxy resin include but are not limited to those sold under the tradename PKHA, PKHB, PKHB+, PKHC, PKHH, PKHJ, PKFE, PKHP-200 or PKHW-34 from Gabriel Performance Products and YP50S sold by Nippon Steel & Sumikin Chemical.

The polyester may be prepared by esterification of dicarboxylic aromatic compounds with dihydroxyl aromatic compounds. Examples of the polyester include but are not limited to a dicyclopentadiene-containing polyester and a naphthalene-containing polyester, preferably a naphthalene-containing polyester. A suitable polyester for the present disclosure includes, but not limited to, HPC-8000 or HPC-8150 available from D.I.C. Corporation.

As a property modifier, examples of polyolefin resin include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, hydrogenated styrene-butadiene-divinylbenzene copolymer, polybutadiene (homopolymer of butadiene), methyl styrene copolymer or a combination thereof.

In one embodiment, the resin composition disclosed herein comprises: 30 parts by weight of thermosetting resin; 50 to 125 parts by weight of maleimide resin; 5 to 35 parts by weight of monofunctional long-chain alkyl acrylate monomer; and 20 to 40 parts by weight of polyester.

In addition, the resin composition disclosed herein may optionally further comprise the following additive: flame retardant, inorganic filler, curing accelerator, solvent, coupling agent, coloring agent, toughening agent or a combination thereof. Moreover, with the proviso that one or more of the properties described below are not deteriorated, the amount of the additive used is not particularly limited. For example, relative to 30 parts by weight of the thermosetting resin, the resin composition of the present disclosure may comprise 1 to 200 parts by weight of one or more additives.

The flame retardant may be any one or more flame retardants used for preparing a prepreg, a resin film, a resin film with copper foil, a laminate or a printed circuit board, including but not limited to a phosphorus-containing flame retardant. Preferred examples of the flame retardant include but are not limited to any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate and aluminum phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

The inorganic filler may be any one or more inorganic fillers used for preparing a prepreg, a resin film, a resin film with copper foil, a laminate or a printed circuit board; examples of the inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOOH), calcined talc, talc, silicon nitride and calcined kaolin. Moreover, the inorganic filler can be spherical, fibrous, plate-like, particulate, sheet-like or whisker-like in shape and can be optionally pretreated by a silane coupling agent.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

The solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

The coupling agent includes, but not limited to, a silane coupling agent, which may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof.

The resin compositions of various embodiments may be used for making different articles, including but not limited to a prepreg, a resin film, a resin film with copper foil, a laminate or a printed circuit board.

For example, the resin composition according to each of the various embodiments may be coated on a polyester (PET) film or a polyimide (PI) film, followed by baking and heating to the semi-cured state (B-Stage) to obtain a resin film.

For example, the resin composition according to each of the various embodiments may be coated on a copper foil, followed by baking and heating to the semi-cured state to obtain the resin film with copper foil, such as a resin coated copper (RCC).

For example, the resin composition according to each of the various embodiments may be used to make a prepreg, which has a reinforcement material and a layered structure formed thereon, wherein the layered structure is made by heating the resin composition to a semi-cured state (B-Stage) at a temperature for example between 130° C. and 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, resin compositions of various embodiments of the present disclosure may be made into a laminate, such as a copper-clad laminate, which comprises two copper foils and an insulation layer disposed between the copper foils, wherein the insulation layer is made by curing the resin compositions at high temperature and high pressure, a suitable curing temperature being for example between 190° C. and 220° C. and preferably between 200° C. and 215° C. and a suitable curing time being 60 to 180 minutes and preferably 90 to 120 minutes. The insulation layer may be obtained by curing the aforesaid prepreg, resin film with copper foil or resin film. In one preferred embodiment, the laminate is a copper-clad laminate.

In one embodiment, the laminate may be further processed by trace formation processes to provide a printed circuit board.

Articles made from the resin composition according to the present disclosure have any one or more advantages of a higher glass transition temperature, lower dissipation factor, good drilling reliability, higher peeling strength for ordinary copper foils and ultra-thin copper foils, lower minimum dynamic viscosity and good filling property for inner layer wiring boards.

For example, the resin composition according to the present disclosure may achieve one, more or all of the following properties:

a glass transition temperature as measured by using a dynamic mechanical analyzer by reference to IPC-TM-650 2.4.24.4 of greater than or equal to 200° C., such as between 200° C. and 350° C.;

a dissipation factor at 10 GHz as measured by reference to JIS C2565 of less than or equal to 0.0080, such as between 0.0050 and 0.0077, preferably between 0.0050 and 0.0070;

a peeling strength as measured by using a tensile strength tester by reference to IPC-TM-650 2.4.8 of greater than or equal to 3.4 lb/in, such as a peeling strength for a 18 μm ordinary copper foil or a 3 μm ultra-thin copper foil of between 3.4 lb/in and 6.0 lb/in, preferably between 4.0 lb/in and 5.2 lb/in;

a minimum dynamic viscosity of less than or equal to 500 Pa·s, such as between 200 Pa·s and 500 Pa·s; and absence of void by visual inspection in a filling property test;

preferably, articles made from the resin composition may pass a drilling reliability test without delamination.

Specifically, the resin compositions according to the present disclosure and articles made therefrom may achieve one, more or all of the following features:

a specific ratio of the monofunctional long-chain alkyl acrylate monomer used in conjunction with the maleimide resin may achieve a lower minimum dynamic viscosity (≤500 Pa·s) and good filling property for inner layer wiring boards (pass) without deteriorating the glass transition temperature (Tg≥200° C.);

a property modifier (e.g., 20-40 PHR of polyester) may be further added to achieve a low dissipation factor (Df≤0.0070) and high peeling strength (RTF P/S≥4.0 lb/in; 3 μm ultra-thin copper foil P/S≥4.0 lb/in); and by using a resin composition comprising 30 parts by weight of thermosetting resin, 5 to 35 parts by weight of monofunctional long-chain alkyl acrylate monomer, 50 to 125 parts by weight of maleimide resin and 20 to 40 parts by weight of polyester, the present disclosure may achieve all of the following desirable effects: Tg≥200° C., Df≤0.0070, good drilling reliability (Pass), RTF P/S≥4.0 lb/in, 3 μm ultra-thin copper foil P/S≥4.0 lb/in, minimum dynamic viscosity ≤500 Pa·s and good filling property for inner layer wiring boards (pass).

Materials and reagents used in Preparation Examples, Examples and Comparative Examples disclosed herein are listed below:

NC-3000H: biphenyl epoxy resin, available from Nippon Kayaku.

YX-7700: m-dimethylphenol novolac type epoxy resin, available from Mitsubishi Chemical.
CEO5CS: novolac type cyanate ester resin, available from Techia Material Corporation.
PF-3500: oxydianiline type benzoxazine resin, available from Chang Chun Plastics.
LZ-8298: phenolphthalein type benzoxazine resin, available from Huntsman.
KZH-5031: vinyl-modified benzoxazine resin, available from Kolon Industries.
HPC-8150: naphthalene-containing polyester, available from D.I.C. Corporation.
HPC-8000: dicyclopentadiene-containing polyester, available from D.I.C. Corporation.
BMI-2300: phenylmethane maleimide, available from Daiwa Fine Chemicals Co., Ltd.
BMI-70: bis(3-ethyl-5-methyl-4-maleimidephenyl) methane, available from K.I Chemical Industry Co., Ltd.
SR313A: dodecyl methacrylate, available from Sartomer.
SR324NS: octadecyl methacrylate, available from Sartomer.
SR340: 2-phenoxyethyl methacrylate, available from Sartomer.
SR35ONS: trimethylolpropane trimethacrylate, available from Sartomer.
SR833S: tricyclodecane dimethanol diacrylate, available from Sartomer.
Poly SR313A: dodecyl methacrylate polymer, available by subjecting dodecyl methacrylate
SR313A to stirring at 80° C. and 400 r.p.m. for an hour, the polymer having a weight average molecular weight of about 10,000.
2PZ: 2-phenylimidazole, available from Shikoku Chemicals Corp.
Q89: spherical silica pre-treated by amino silane coupling agent, available from Jinyi Silicon Materials Development Co., Ltd.
MEK: methyl ethyl ketone, commercially available.

Samples (specimens) were prepared as described below and tested and analyzed under specified conditions below.

1. Prepreg: Resin composition from each Example and each Comparative Example (in part by weight) was separately well-mixed to form a varnish, which was then loaded to an impregnation tank; a fiberglass fabric was impregnated into the impregnation tank to adhere the resin composition onto the fiberglass fabric, followed by heating and baking at 130° C. for about 4 minutes to obtain a prepreg.

2. Copper-clad laminate (formed by lamination of eight prepregs): Two 18 μm reverse treated copper foils (RTFs) and eight prepregs made from each resin composition (using 2116 E-glass fiber fabrics) were prepared. Each prepreg has a resin content of about 55%. A copper foil, eight prepregs and a copper foil were superimposed in such order and then subject to a vacuum condition for lamination at 200° C. for 1.5 hours to form each copper-clad laminate sample. Insulation layers were formed by curing (C-stage) eight sheets of superimposed prepreg between the two copper foils, and the resin content of the insulation layers is about 55%.

3. Copper-free laminate (formed by lamination of eight prepregs): Each copper-clad laminate was etched to remove the two copper foils to obtain a copper-free laminate made from laminating eight prepregs and having a resin content of about 55%.

4. Copper-free laminate (formed by lamination of two prepregs): Two 18 μm reverse treated copper foils and two prepregs made from each resin composition (using 1080 E-glass fiber fabrics) were prepared. Each prepreg has a resin content of about 70%. A copper foil, two prepregs and a copper foil were superimposed in such order and then subject to a vacuum condition for lamination at 200° C. for 1.5 hours to form each copper-clad laminate sample. Next, each copper-clad laminate was etched to remove the two copper foils to obtain a copper-free laminate made from laminating two prepregs and having a resin content of about 70%.

Test items and test methods are described below.

Glass Transition Temperature (Tg)

The copper-free laminate (obtained by laminating eight prepregs) sample was subject to glass transition temperature measurement. The glass transition temperature of each sample was measured using dynamic mechanical analysis (DMA) method by reference to IPC-TM-650 2.4.24.4, and higher glass transition temperature (in ° C.) is better.

Dissipation Factor (Df)

The copper-free laminate (obtained by laminating two prepregs) sample was subject to dissipation factor measurement. Each sample was measured by using a microwave dielectrometer (available from AET Corp.) by reference to JIS C2565 at room temperature (about 25° C.) and under 10 GHz frequency. Lower dissipation factor represents better dielectric properties of the sample. A difference in Df of greater than 0.0005 represents a significant difference in dissipation factor in different laminates.

Drilling Reliability

Seven prepregs (using 2116 E-glass fiber fabric) were prepared and covered on each outer side with a 18 μm RTF copper foil; in the order of copper foil, seven prepregs and copper foil, lamination and curing were performed for 1.5 hours in vacuum at high temperature (200° C.) and high pressure (360 psi) to obtain a copper-clad laminate. The copper-clad laminate was subject to PCB processing, such as drilling, adhesive residue removal, electroplating, etc., to obtain a double-sided board (pitch between hole centers: 0.55 mm). The double-sided board was placed in a 260° C. reflow oven and subject to a reflow test by reference to IPC-TM-650 2.6.27; after six reflow cycles, the double-sided board was examined by visual inspection or microsection and examined by an optical microscope to determine whether delamination occurred. Absence of delamination is designated as "Pass," and presence of delamination is designated as "Fail".

Peeling Strength (P/S)

The copper-clad laminate (obtained by laminating eight prepregs) was cut into a rectangular specimen with a width of 24 mm and a length of greater than 60 mm, which was etched to remove surface copper foil and leaving a rectangular copper foil with a width of 3.18 mm and a length of greater than 60 mm, and tested by using a tensile strength tester by reference to IPC-TM-650 2.4.8 at room temperature (about 25° C.) to measure the force (1b/in) required to separate the copper foil from the insulation layer. In general, a difference in peeling strength of copper foil of greater than 0.3 lb/in represents a significant difference in different laminates.

Peeling Strength of Ultra-Thin (3 μm) Copper Foil

A core was prepared as follows: preparing four first prepregs (using 7628 E-glass fabric, RC=42%); a copper foil was covered on two sides of the four superimposed prepregs, followed by lamination and curing for 1.5 hours in vacuum at high temperature (200° C.) and high pressure (360 psi) to obtain a copper-containing core. Then the core was subject to a brown oxidation process to obtain a brown oxide treated core. A prepreg was placed on both sides of the brown oxide treated core, wherein the two prepregs may be made from the resin composition of the same example or same comparative example (using 2116 E-glass fiber fabric and having a resin content of about 55%); a carrier-attached 3 μm ultra-thin copper foil (MT18-EX, available from Mitsui Kinzoku) was covered on the outer sides of the two prepregs, and then the carrier-attached ultra-thin copper foil (with the copper foil surface adhered to the prepreg and the carrier layer away from the prepreg), prepregs, brown oxide treated core, prepreg and carrier-attached ultra-thin copper foil were superimposed in said order, followed by lamination for 1.5 hours in vacuum at 200° C. to obtain an ultra-thin copper-containing laminate. Carrier copper on the ultra-thin copper surface of the laminate was peeled off and electroplating of the whole plate was performed without cleaning, such that the copper layer has a thickness of 35 μm to form a four-layer circuit board. The four-layer circuit board was cut into a rectangular specimen with a width of 24 mm and a length of greater than 60 mm, which was etched to remove surface copper foil and leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer. In general, a difference in peeling strength of ultra-thin copper foil of greater than 0.3 lb/in represents a significant difference in different laminates.

Minimum Dynamic Viscosity (Measured from Samples Such as Prepregs, Resin Films, Resin Films with Copper Foil, Etc.)

About 2±0.05 g of powder collected from rubbing a prepreg was poured into a tablet mold and shaped by using a manual tableting press with a 1 psi pressure, and then the sample was measured by a capillary rheometer (CFT-100D, available from Sanpany Instruments Co., Ltd.) with a pressure of 4 kgf, a temperature increase rate of 2° C./minute, and a temperature range of 60 to 160° C., wherein the lowest viscosity value is referred to as the minimum dynamic viscosity. Lower minimum dynamic viscosity represents lower resin viscosity and therefore higher flowability during lamination. A minimum dynamic viscosity of greater than 500 Pa·s is undesirably too high, such that during lamination, problems may arise due to poor flowability, including uneven surface, poor adhesion, and uneven laminate thickness.

Filling Property for Inner Layer Wiring Boards (Filling Property Test)

One prepreg (resin content of about 73%) obtained from 1078 E-glass fiber fabric impregnated with resin from each Example or Comparative Example was prepared and covered on both sides with a 18 μm RTF copper foil, followed by lamination to form a copper-clad laminate. The surface of the copper-clad laminate was subject to wiring etching and then brown oxidation process to obtain a brown oxide treated wiring laminate. On the wiring at both sides, a prepreg (resin content of about 75%) made from 1027 E-glass fiber fabric and then a 18 μm RTF copper foil were covered, followed by lamination to form a second copper-clad wiring laminate. Surface copper foils of the second copper-clad wiring laminate were removed by etching to obtain a copper-free second wiring laminate, which was inspected visually to determine whether poor uniformity or void defect was present. Uniform appearance and absence of void represents good filling property for inner layer wiring boards (designated as "Pass"), and non-uniform appearance and presence of void represents poor filling property for inner layer wiring boards (designated as "Fail").

Compositions and test results of Examples and Comparative Examples are listed in Table 1 to Table 4.

TABLE 1

Resin compositions of Examples (in part by weight) and test results

| Component | Name | E1 | E2 | E3 | E4 | E5 | E6 | E7 |
|---|---|---|---|---|---|---|---|---|
| thermosetting resin | NC-3000H | 30 | | 30 | 30 | 30 | 10 | 10 |
| | YX-7700 | | 30 | | | | | |
| | CE05CS | | | | | | 20 | |
| | PF-3500 | | | | | | | 20 |
| | LZ-8298 | | | | | | | |
| | KZH-5031 | | | | | | | |
| polyester | HPC-8150 | 30 | 30 | 30 | 30 | 30 | 30 | 30 |
| | HPC-8000 | | | | | | | |
| maleimide resin | BMI-2300 | 100 | 100 | 100 | | 50 | 100 | 100 |
| | BMI-70 | | | | 100 | 50 | | |
| acrylate | SR313A | 20 | 20 | | 20 | 20 | 20 | 20 |
| | SR324NS | | | 20 | | | | |
| | SR340 | | | | | | | |
| | SR350NS | | | | | | | |
| | SR833S | | | | | | | |
| | Poly SR313A | | | | | | | |
| curing accelerator | 2PZ | 1 | 1 | 1 | 1 | 1 | 1 | 1 |
| inorganic filler | Q89 | 100 | 100 | 100 | 100 | 100 | 100 | 100 |
| solvent | MEK | 30 | 30 | 30 | 30 | 30 | 30 | 30 |

| Property | Unit | E1 | E2 | E3 | E4 | E5 | E6 | E7 |
|---|---|---|---|---|---|---|---|---|
| DMA Tg | ° C. | 260 | 260 | 258 | 210 | 240 | 271 | 256 |
| Df@10 GHz | none | 0.0064 | 0.0063 | 0.0065 | 0.0059 | 0.0062 | 0.0055 | 0.0062 |
| drilling reliability | none | Pass | Pass | Pass | Pass | Pass | Pass | Pass |
| peeling strength | lb/in | 4.8 | 4.8 | 4.3 | 4.6 | 4.6 | 4.6 | 4.7 |
| peeling strength (3 μm copper foil) | lb/in | 4.7 | 4.7 | 4.2 | 4.5 | 4.5 | 4.4 | 4.6 |

TABLE 1-continued

Resin compositions of Examples (in part by weight) and test results

| | | | | | | | | |
|---|---|---|---|---|---|---|---|---|
| minimum dynamic viscosity | Pa · s | 320 | 320 | 320 | 320 | 320 | 450 | 380 |
| filling property for inner layer wiring boards | none | Pass | Pass | Pass | Pass | Pass | Pass | Pass |

TABLE 2

Resin compositions of Examples (in part by weight) and test results

| Component | Name | E8 | E9 | E10 | E11 | E12 | E13 | E14 |
|---|---|---|---|---|---|---|---|---|
| thermosetting resin | NC-3000H | 10 | 10 | 10 | 12 | 4 | 30 | 30 |
| | YX-7700 | | | | | | | |
| | CE05CS | | | 10 | 3 | 14 | | |
| | PF-3500 | | | 10 | 15 | 12 | | |
| | LZ-8298 | 20 | | | | | | |
| | KZH-5031 | | 20 | | | | | |
| polyester | HPC-8150 | 30 | 30 | 30 | 30 | 30 | 30 | 30 |
| | HPC-8000 | | | | | | | |
| maleimide resin | BMI-2300 | 100 | 100 | 100 | 100 | 100 | 100 | 100 |
| | BMI-70 | | | | | | | |
| acrylate | SR313A | 20 | 20 | 20 | 20 | 20 | 5 | 35 |
| | SR324NS | | | | | | | |
| | SR340 | | | | | | | |
| | SR350NS | | | | | | | |
| | SR833S | | | | | | | |
| | Poly SR313A | | | | | | | |
| curing accelerator | 2PZ | 1 | 1 | 1 | 1 | 1 | 1 | 1 |
| inorganic filler | Q89 | 100 | 100 | 100 | 100 | 100 | 100 | 100 |
| solvent | MEK | 30 | 30 | 30 | 30 | 30 | 30 | 30 |

| Property | Unit | E8 | E9 | E10 | E11 | E12 | E13 | E14 |
|---|---|---|---|---|---|---|---|---|
| DMA Tg | ° C. | 250 | 293 | 262 | 265 | 272 | 268 | 235 |
| Df@10 GHz | none | 0.0058 | 0.0067 | 0.0058 | 0.0061 | 0.0057 | 0.0068 | 0.0061 |
| drilling reliability | none | Pass | Pass | Pass | Pass | Pass | Pass | Pass |
| peeling strength | lb/in | 4.2 | 4.9 | 4.4 | 4.8 | 4.2 | 5.2 | 4.1 |
| peeling strength (3 μm copper foil) | lb/in | 4.1 | 4.8 | 4.3 | 4.6 | 4.1 | 5.1 | 4.0 |
| minimum dynamic viscosity | Pa · s | 370 | 450 | 420 | 390 | 460 | 430 | 260 |
| filling property for inner layer wiring boards | none | Pass | Pass | Pass | Pass | Pass | Pass | Pass |

TABLE 3

Resin compositions of Examples (in part by weight) and test results

| Component | Name | E15 | E16 | E17 | E18 | E19 | E20 | E21 | E22 |
|---|---|---|---|---|---|---|---|---|---|
| thermosetting resin | NC-3000H | 30 | 30 | 10 | 10 | 10 | 10 | 10 | 10 |
| | YX-7700 | | | | | | | | |
| | CE05CS | | | 10 | 10 | 10 | 10 | 10 | 10 |
| | PF-3500 | | | 10 | 10 | 10 | 10 | 10 | 10 |
| | LZ-8298 | | | | | | | | |
| | KZH-5031 | | | | | | | | |
| polyester | HPC-8150 | 30 | 30 | 20 | 40 | | 5 | 70 | |
| | HPC-8000 | | | | | | | | 30 |
| maleimide resin | BMI-2300 | 50 | 125 | 100 | 100 | 100 | 100 | 100 | 100 |
| | BMT-70 | | | | | | | | |
| acrylate | SR313A | 20 | 20 | 20 | 20 | 20 | 20 | 20 | 20 |
| | SR324NS | | | | | | | | |
| | SR340 | | | | | | | | |
| | SR350NS | | | | | | | | |
| | SR833S | | | | | | | | |
| | Poly SR313A | | | | | | | | |

TABLE 3-continued

Resin compositions of Examples (in part by weight) and test results

| | | | | | | | | | |
|---|---|---|---|---|---|---|---|---|---|
| curing accelerator | 2PZ | 1 | 1 | 1 | 1 | 1 | 1 | 1 | 1 |
| inorganic filler | Q89 | 100 | 100 | 100 | 100 | 100 | 100 | 100 | 100 |
| solvent | MEK | 30 | 30 | 30 | 30 | 30 | 30 | 30 | 30 |

| Property | Unit | E15 | E16 | E17 | E18 | E19 | E20 | E21 | E22 |
|---|---|---|---|---|---|---|---|---|---|
| DMA Tg | °C. | 215 | 266 | 266 | 255 | 312 | 309 | 202 | 258 |
| Df@10 GHz | none | 0.0062 | 0.0060 | 0.0064 | 0.0057 | 0.0077 | 0.0077 | 0.0054 | 0.0058 |
| drilling reliability | none | Pass | Pass | Pass | Pass | Fail | Fail | Fail | Pass |
| peeling strength | lb/in | 4.5 | 4.2 | 4.6 | 4.2 | 4.7 | 4.6 | 3.5 | 3.6 |
| peeling strength (3 μm copper foil) | lb/in | 4.2 | 4.1 | 4.5 | 4.1 | 4.6 | 4.5 | 3.4 | 3.5 |
| minimum dynamic viscosity | Pa·s | 320 | 370 | 380 | 430 | 350 | 400 | 380 | 420 |
| filling property for inner layer wiring boards | none | Pass | Pass | Pass | Pass | Pass | Pass | Pass | Pass |

TABLE 4

Resin compositions of Comparative Examples (in part by weight) and test results

| Component | Name | C1 | C2 | C3 | C4 | C5 | C6 | C7 | C8 |
|---|---|---|---|---|---|---|---|---|---|
| thermosetting resin | NC-3000H | 30 | 30 | 30 | 30 | 30 | 30 | 30 | 30 |
| | YX-7700 | | | | | | | | |
| | CE05CS | | | | | | | | |
| | PF-3500 | | | | | | | | |
| | LZ-8298 | | | | | | | | |
| | KZH-5031 | | | | | | | | |
| polyester | HPC-8150 | 30 | 30 | 30 | 30 | 30 | 30 | 30 | 30 |
| | HPC-8000 | | | | | | | | |
| maleimide resin | BMI-2300 | 100 | 100 | 10 | 150 | 100 | 100 | 100 | 100 |
| | BMI-70 | | | | | | | | |
| acrylate | SR313A | | 70 | 20 | 20 | | | | |
| | SR324NS | | | | | | | | |
| | SR340 | | | | | 20 | | | |
| | SR350NS | | | | | | 20 | | |
| | SR833S | | | | | | | 20 | |
| | Poly SR313A | | | | | | | | 20 |
| curing accelerator | 2PZ | 1 | 1 | 1 | 1 | 1 | 1 | 1 | 1 |
| inorganic filler | Q89 | 100 | 100 | 100 | 100 | 100 | 100 | 100 | 100 |
| solvent | MEK | 30 | 30 | 30 | 30 | 30 | 30 | 30 | 30 |

| Property | Unit | C1 | C2 | C3 | C4 | C5 | C6 | C7 | C8 |
|---|---|---|---|---|---|---|---|---|---|
| DMA Tg | °C. | 270 | 180 | 165 | 290 | 257 | 265 | 260 | 260 |
| Df@10 GHz | none | 0.0069 | 0.0055 | 0.0064 | 0.0060 | 0.0063 | 0.0064 | 0.0070 | 0.0068 |
| drilling reliability | none | Pass | Fail | Pass | Fail | Fail | Fail | Fail | Pass |
| peeling strength | lb/in | 5.3 | 3.1 | 4.8 | 3.4 | 3.3 | 3.0 | 3.8 | 4.8 |
| peeling strength (3 μm copper foil) | lb/in | 5.2 | 3.0 | 4.6 | 3.3 | 3.2 | 2.7 | 3.6 | 4.7 |
| minimum dynamic viscosity | Pa·s | 520 | 1500 | 550 | 350 | 480 | 1285 | 1345 | 680 |
| filling property for inner layer wiring boards | none | Fail | Pass | Pass | Fail | Fail | Fail | Fail | Fail |

The following observations can be made according to the test results above.

Compared with Example E1, Comparative Example C1 does not contain a monofunctional long-chain alkyl acrylate monomer, such that the minimum dynamic viscosity increased to 520 Pa·s and problems of poor uniformity and presence of voids were found in the filling property test, while Comparative Example C2 contains excessive monofunctional long-chain alkyl acrylate monomer, such that the glass transition temperature decreased to 180° C. and the minimum dynamic viscosity increased to 1500 Pa·s. In contrast, Example E1 achieves a glass transition temperature of greater than or equal to 200° C., a lower minimum dynamic viscosity and good filling property for inner layer wiring boards.

Compared with Example E1, Comparative Example C3 contains insufficient maleimide resin, such that the glass transition temperature decreased to 165° C. and the minimum dynamic viscosity increases to 550 Pa·s, while Comparative Example C4 contains excessive maleimide resin, such that poor drilling reliability and low peeling strength were observed, and problems of poor uniformity and presence of voids were found in the filling property test. In contrast, Example E1 achieves a glass transition temperature of greater than or equal to 200° C., a lower minimum dynamic viscosity and good filling property for inner layer wiring boards.

Compared with Example E1, Comparative Example C5 contains a monofunctional aromatic methacrylate, such that problems of poor uniformity and presence of voids were found in the filling property test; Comparative Example C6 contains a trifunctional methacrylate, such that the minimum dynamic viscosity increased to 1285 Pa·s and problems of poor uniformity and presence of voids were found in the filling property test; and Comparative Example C7 contains a bifunctional dicyclopentadiene methacrylate, such that the minimum dynamic viscosity increased to 1345 Pa·s and problems of poor uniformity and presence of voids were found in the filling property test, wherein the aforesaid monofunctional aromatic methacrylate, trifunctional methacrylate and bifunctional dicyclopentadiene methacrylate do not belong to the monofunctional long-chain alkyl acrylate monomer. Comparative Example C8 contains a polymer of the monofunctional long-chain alkyl acrylate monomer, such that the minimum dynamic viscosity increased to 680 Pa·s and problems of poor uniformity and presence of voids were found in the filling property test. In contrast, Example E1 achieves a glass transition temperature of greater than or equal to 200° C., a lower minimum dynamic viscosity and good filling property for inner layer wiring boards.

Compared with Examples E10 to E12, E17 and E18, Example E19 does not contain a polyester, such that the dissipation factor increased to 0.0077 and delamination occurred in the reflow test after drilling, indicating undesirable drilling reliability; Example E20 contains insufficient naphthalene-containing polyester, such that the dissipation factor increased to 0.0077 and delamination occurred in the reflow test after drilling, indicating undesirable drilling reliability; Example E21 contains excessive naphthalene-containing polyester, such that delamination occurred in the reflow test after drilling, indicating undesirable drilling reliability, the peeling strength for ordinary copper foil decreased to 3.5 lb/in, and the peeling strength for ultra-thin copper foil decreased to 3.4 lb/in; and Example E22 contains a dicyclopentadiene-containing polyester, such that the peeling strength for ordinary copper foil decreased to 3.6 lb/in, and the peeling strength for ultra-thin copper foil decreased to 3.5 lb/in. In contrast, Examples E10 to E12, E17 and E18 do not have delamination problem in the reflow test after drilling, indicating desirable drilling reliability, and all achieve a peeling strength for ordinary copper foil of ≥4.0 lb/in and a peeling strength for ultra-thin copper foil of ≥4.0 lb/in.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   30 parts by weight of a thermosetting resin, wherein the thermosetting resin comprises 4 to 30 parts by weight of epoxy resin selected from the group consisting of biphenyl epoxy resin, m-dimethylphenol novolac epoxy resin and a combination thereof, 3 to 20 parts by weight of novolac cyanate ester resin, 10 to 20 parts by weight of benzoxazine resin selected from the group consisting of oxydianiline benzoxazine resin, phenolphthalein benzoxazine resin, vinyl-modified benzoxazine resin and a combination thereof, or a combination thereof;
   50 to 125 parts by weight of maleimide resin selected from the group consisting of phenylmethane maleimide, bis(3-ethyl-5-methyl-4-maleimidephenyl) methane and a combination thereof;
   5 to 35 parts by weight of monofunctional long-chain alkyl acrylate monomer having a structure as shown below, wherein n is 11 or 17:

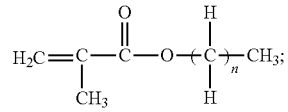

and
   20 to 40 parts by weight of a polyester selected from the group consisting of naphthalene-containing polyester, dicyclopentadiene-containing polyester and a combination thereof.

2. The resin composition of claim 1, further comprising a property modifier which comprises a small molecule vinyl compound, an amine curing agent, a phenoxy resin, a polyester, a polyolefin resin or a combination thereof.

3. The resin composition of claim 1, further comprising flame retardant, inorganic filler, curing accelerator, solvent, coupling agent, coloring agent, toughening agent or a combination thereof.

4. An article made from the resin composition of claim 1, comprising a prepreg, a resin film, a resin film with copper foil, a laminate or a printed circuit board.

5. The article of claim 4, having a glass transition temperature as measured by using a dynamic mechanical analyzer by reference to IPC-TM-650 2.4.24.4 of greater than or equal to 200° C.

6. The article of claim 4, having a peeling strength as measured by using a tensile strength tester by reference to IPC-TM-650 2.4.8 of greater than or equal to 3.4 lb/in.

7. The article of claim 4, having a minimum dynamic viscosity of less than or equal to 500 Pa·s.

8. The article of claim 4, characterized by absence of void by visual inspection in a filling property test.

* * * * *